Oct. 4, 1949.   H. BLANCHETTE   2,483,521
AIR SUCTION CLUTCH
Filed March 27, 1947
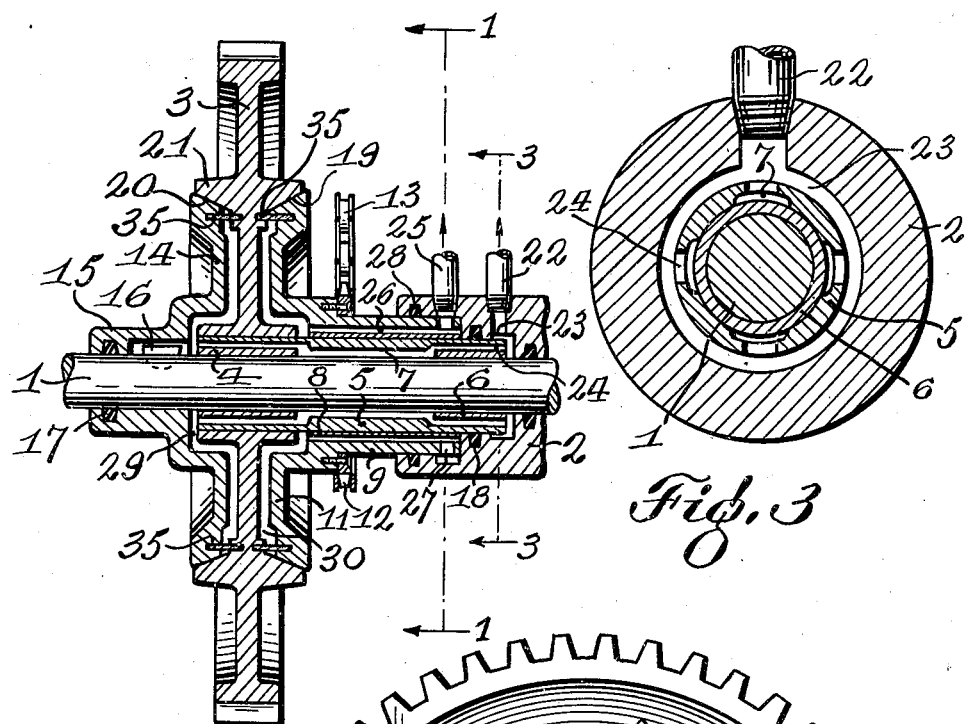
Fig. 2
Fig. 3
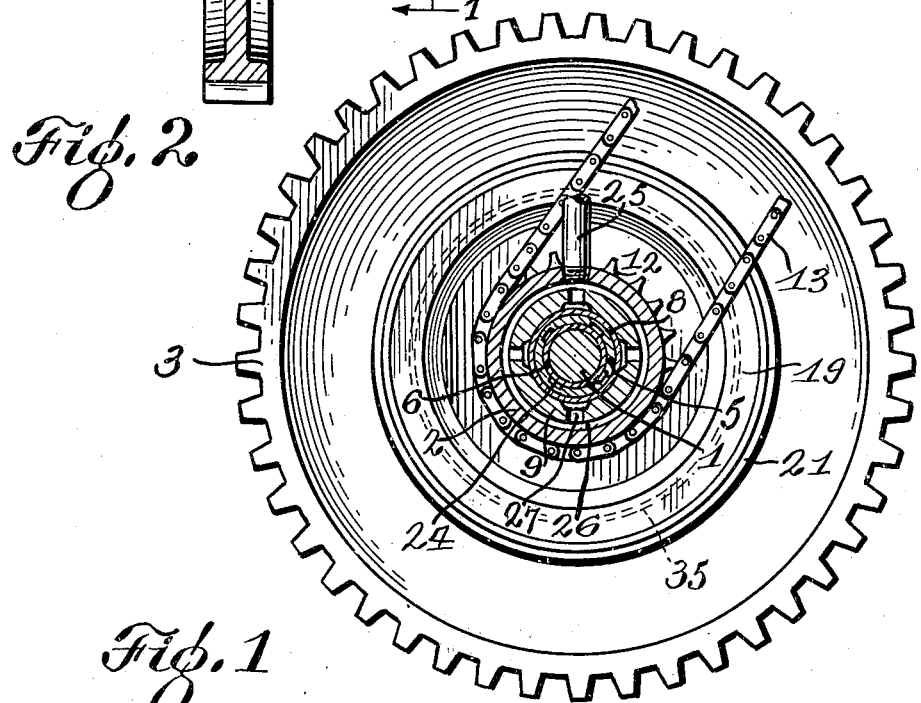
Fig. 1
Hilaire Blanchette  Inventor
By  Attorneys Patented Oct. 4, 1949

2,483,521

UNITED STATES PATENT OFFICE 2,483,521

AIR SUCTION CLUTCH

Hilaire Blanchette, St. Simon de Drummond, Quebec, Canada

Application March 27, 1947, Serial No. 737,670
In Canada April 12, 1946

3 Claims. (Cl. 192—87)

1

The present invention pertains to a novel air suction clutch for effecting a selective drive.

The principal object of the invention is to provide a double clutch of this character adapted for selectively driving two driven members. More particularly, the clutch is designed for use in connection with butter handling machinery.

The invention includes a driven shaft on which is loosely mounted a drive gear. Clutch plates are mounted on opposite sides of the web of the gear in spaced relation thereto, one of these plates being keyed to the shaft and the other loosely mounted on the shaft. The gear is formed with a double clutch face engaged by one or the other of the clutch plates when the pressure is reduced in the space between that plate and the web of the gear. The clutch plate that is loose on the shaft carries a drive member such as a sprocket wheel connected by a chain to other mechanism. This plate is also formed with a boss enclosing the shaft and having internal passages connected to the corresponding space between the clutch plate and the gear. A suction line is connected to this passage.

In somewhat similar manner a sleeve with longitudinal passages surrounds the shaft and extends through the gear to provide a fluid path to the space between the gear and the clutch plate. Another suction line is connected to the last named passage, and the two lines may be provided with a selector valve so that either clutch plate may be engaged with the gear but not both simultaneously.

The invention is fully disclosed by way of example in the following description and in the accompanying drawings in which:

Fig. 1 is a side elevation of the device, partly in section on the line 1—1 of Figure 2;

Fig. 2 is a longitudinal section; and

Fig. 3 is a section on the line 3—3 of Figure 2.

Reference to these views will now be made by use of like characters which are employed to designate corresponding parts throughout.

In Figure 2 is shown a main drive shaft 1 supported in suitable bearings, one of which is the block 2. A main drive gear 3 is loosely mounted on the shaft 1 through a sleeve bearing 4, and an extended sleeve 5 supported in the boss 2 by a sleeve bearing 6. The sleeve 5 is formed with a series of longitudinal grooves or passages 7 from end to end.

Between the gear 3 and the exposed end of the sleeve 5, the sleeve is surrounded by a sleeve bearing 8 on which is mounted a boss 9 formed

2 also with a series of longitudinal grooves from end to end. One end of the boss 9 carries a clutch plate 11 disposed adjacent to and spaced slightly from the web of the gear 3. The boss 9 also has a drive sprocket wheel 12 secured thereto by suitable means and engaged by a sprocket chain 13 connected to another piece of apparatus.

On the opposite side of the web of the gear 3 is another clutch plate 14 spaced therefrom and formed with a hub 15 slidably mounted on the shaft 1. The hub 15 is also rotatable with the shaft 1 through a sliding key 16. A suitable air seal 17 is inserted in the member 15 in engagement with the shaft 1. A similar air seal 18 is mounted in the block 2 at the outer end of the boss 9 and in engagement with the sleeve bearing 5.

The clutch plates 11 and 14 are formed with clutch faces 19 and 20 adapted for selective engagement with a double clutch face or ring 21 formed on the web of the gear 3. A suction line 22 is fastened into the block 2 to communicate with an annular space 23 formed in the block and around the sleeve 5, and thence in communication with the passages 7 through a series of radial ports 24. Another suction line 25 is secured in the block 22 to communicate with an annular passage 26 formed in the block around the boss 9, the passage 26 communicating with the series of longitudinal passages 7 through radial ports 27 formed in the member 9. Another air seal 28 is fitted in the block 2 to engage the boss 9 at the other side of the line 25 from the seal 18, as shown more clearly in Figure 2.

A selector valve (not shown) is preferably inserted in the lines 22, 25 to establish suction in one or the other but not in both simultaneously. When the line 22 is open to a low pressure source, suction is produced in the channel 23, ports 24, longitudinal passages 27 and finally in the space 29 between the gear 3 and the clutch plate 14. The latter is thus drawn into engagement with one of the sides of the double clutch face 21 so that the gear 3, driven by suitable means not shown, drives the shaft 1. The latter is connected to fit an apparatus such as may be embodied, for example, in a butter forming machine. When the line 25 is open to suction, pressure is reduced through the passages 10 in the space 30 between the web of the gear 3 and the clutch plate 11. The latter is thus drawn into engagement with the clutch face 21 of the gear 3, whereby to rotate the sprocket wheel 12 and drive the chain 13. The latter is connected to other mechanism, such as other parts of a butter making machine that do not operate at the same time as those driven by the shafts 1.

To prevent air from passing between ring 21 and faces 19 and 20 of clutch plates 14 and 11, leather bands 35 are inserted in grooves formed to each part in order to receive said bands.

Although a specific embodiment of the invention has been illustrated and described, it will be understood that various alterations in the details of construction may be made without departing from the scope of the invention as indicated by the appended claims.

Having thus described my invention, what I claim is:

1. An air suction clutch comprising a shaft, a pair of clutch plates spacedly mounted thereon, a gear slidably mounted longitudinally between said plates having a clutch face on each side thereof engageable with the corresponding plate, said gear having a sleeve-shaped hub extending along the shaft in one direction and protruding from between the shaft and one clutch plate, longitudinal duct means through said sleeve extending from the protruding end to the space between the gear and the other clutch plate, a suction line connected to said duct means at the protruding sleeve end, other suction means connected to the space between the gear and said one clutch plate, and air sealing means peripherally enclosing the space between each clutch plate and its clutch face; whereby the gear may be brought selectively into engagement with each of said plates by operation of said suction line and said suction means.

2. An air suction clutch comprising a shaft, a pair of clutch plates spacedly mounted thereon, a gear slidably mounted longitudinally between said plates having a clutch face on each side thereof engageable with the corresponding plate, said gear having a sleeve-shaped hub extending along the shaft in one direction and protruding from between the shaft and one clutch plate, longitudinal duct means through said sleeve extending from the protruding end to the space between the gear and the other clutch plate, a boss-shaped hub on the one clutch plate surrounding said sleeve and having a passage therethrough communicating with the space between the gear and the one clutch plate, air sealing means peripherally enclosing the space between each plate and its clutch face, and controllable suction lines connected to said duct means and said passage whereby the gear may be selectively engaged with each plate.

3. An air suction line comprising a shaft, a pair of clutch plates spacedly mounted thereon, a gear slidably mounted longitudinally between said plates having a clutch face on each side thereof engageable with the corresponding plate, said gear having a sleeve-shaped hub extending along the shaft in one direction and protruding from between the shaft and one clutch plate, longitudinal duct means through said sleeve extending from the protruding end to the space between the gear and the other clutch plate, a boss-shaped hub on the one clutch plate surrounding said sleeve and having a passage therethrough communicating with the space between the gear and the one clutch plate, air sealing means peripherally enclosing the space between each plate and its clutch face, a manifold mounted on said shaft surrounding at least a portion of said boss-shaped and sleeve-shaped hubs and having separate sealed annular chambers therein communicating with each of the passage and duct means, and selectively-controllable suction lines connected to said chambers whereby the gear may be selectively engaged with each plate.

HILAIRE BLANCHETTE.

REFERENCES CITED

The following references are of record in the file of this patent:

UNITED STATES PATENTS

| Number | Name | Date |
|---|---|---|
| 283,367 | Barclay | Aug. 21, 1883 |
| 1,937,444 | Shelor | Nov. 28, 1933 |
| 2,338,693 | Dolan | Jan. 4, 1944 |

FOREIGN PATENTS

| Number | Country | Date |
|---|---|---|
| 18,022A | Great Britain | Sept. 6, 1905 |
| 22,508 | Great Britain | Nov. 11, 1899 |